(12) United States Patent
Wu

(10) Patent No.: US 9,172,504 B2
(45) Date of Patent: Oct. 27, 2015

(54) METHOD, APPARATUS AND SYSTEM FOR DOWNLINK CHANNEL TRANSMISSION

(75) Inventor: Yuchun Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 26 days.

(21) Appl. No.: 13/452,203

(22) Filed: Apr. 20, 2012

(65) Prior Publication Data

US 2012/0201216 A1   Aug. 9, 2012

Related U.S. Application Data

(63) Continuation of application No. PCT/CN2010/078276, filed on Nov. 1, 2010.

(30) Foreign Application Priority Data

Oct. 31, 2009 (CN) .......................... 2009 1 0109941
Dec. 31, 2009 (CN) .......................... 2009 1 0217199

(51) Int. Cl.
*H04W 4/00* (2009.01)
*H04L 1/00* (2006.01)
(Continued)

(52) U.S. Cl.
CPC ............ *H04L 1/0072* (2013.01); *H04L 5/0053* (2013.01); *H04L 1/0068* (2013.01); *H04L 1/0071* (2013.01); *H04W 28/18* (2013.01); *H04W 48/08* (2013.01)

(58) Field of Classification Search
USPC ........................................................ 370/329
See application file for complete search history.

(56) References Cited

U.S. PATENT DOCUMENTS

2003/0185242 A1* 10/2003 Lee et al. ....................... 370/491
2010/0279628 A1* 11/2010 Love et al. ....................... 455/70
(Continued)

FOREIGN PATENT DOCUMENTS

CN    101287282    10/2008
CN    101404526    4/2009
(Continued)

OTHER PUBLICATIONS

3GPP TSG-RAN WG1 Meeting #58, Handling DCI formats and blind decoding in LTE-Advanced, R1-093316, Aug. 24, 2009.*
(Continued)

*Primary Examiner* — Yemane Mesfin
*Assistant Examiner* — Jeff Banthrongsack
(74) *Attorney, Agent, or Firm* — Staas & Halsey LLP

(57) ABSTRACT

Embodiments of the present invention disclose a method, an apparatus and a system for downlink channel transmission. The method for downlink channel transmission includes: sending PDCCH information, where original information of the information includes a first part of the information and a second part of the information; the second part of the information includes downlink control information DCI content information, and the first part of the information includes indication information for indicating a related parameter of the DCI content information in the second part of the information; after receiving the PDCCH, obtaining, by a receiving end, the first part of the information and verifies it, if correct, obtaining the related parameter of the DCI content information in the second part of the information according to the indication information, and performing convolutional decoding for specific DCI content information in the second part of the information according to the related parameter.

10 Claims, 9 Drawing Sheets

(51) Int. Cl.
*H04L 5/00* (2006.01)
*H04W 28/18* (2009.01)
*H04W 48/08* (2009.01)

(56) References Cited

U.S. PATENT DOCUMENTS

2010/0287457 A1 11/2010 Zhang et al.
2011/0075624 A1* 3/2011 Papasakellariou et al. ... 370/329

FOREIGN PATENT DOCUMENTS

| CN | 101478808 | 7/2009 |
|----|-----------|--------|
| CN | 101483441 A | 7/2009 |
| WO | WO 2004/066546 A1 | 8/2004 |

OTHER PUBLICATIONS

Draft 3GPP TS 36.211 V8.4.5.0, "3$^{rd}$ Generation Partnership Project; Technical Specification Group Radio Access Network; Evolved Universal Terrestrial Radio Access (E-UTRA); Physical Channels and Modulation (Release 8)", Technical Specification, Sep. 2008, pp. 1-77.
Draft 3GPP TS 36.212 V8.4.5.0, "3$^{rd}$ Generation Partnership Project; Technical Specification Group Radio Access Network; Evolved Universal Terrestrial Radio Access (E-UTRA); Multiplexing and channel coding (Release 8)", Technical Specification, Sep. 2008, pp. 1-55.
Draft 3GPP TS 36.213 V8.4.5.0, "3$^{rd}$ Generation Partnership Project; Technical Specification Group Radio Access Network; Evolved Universal Terrestrial Radio Access (E-UTRA); Physical layer procedures (Release 8)", Technical Specification, Sep. 2008, pp. 1-59.
R1-093280, "Blind Decoding in LTE-Advanced", 3GPP TSG RAN WG1 Meeting #54, Aug. 2009, pp. 1-3.
R1-093316, "Handing DCI formats and blind decoding in LTE-Advanced", 3GPP TSG RAN WG1 Meeting #58, Aug. 2009, pp. 1-6.
Chinese Office Action mailed Jun. 28, 2013 in corresponding Chinese Application No. 200910217199.2.
International Search Report of PCT/CN2010/078276 mailed Feb. 10, 2011.
Extended European Search Report mailed Mar. 25, 2013 for corresponding European Application No. 10826114.0.
Chinese Search Report mailed Jan. 16, 2013 for corresponding Chinese Application No. 2009102171992.
Written Opinion of the International Searching Authority mailed Feb. 10, 2011 for corresponding International Application No. PCT/CN2010/078276.
Nokia et al., "Handling DCI formats and blind decoding in LTE-Advanced", 3$^{rd}$ Generation Partnership Project (3GPP), vol. RAN WGI No. Miyazaki, Meeting #58bis, Oct. 12-16, 2009, 6 pp.

* cited by examiner

Note: The indication information may be one or more pieces of DCI type, bandwidth, and the number of transmission antenna ports

METHOD, APPARATUS AND SYSTEM FOR DOWNLINK CHANNEL TRANSMISSION

CROSS-REFERENCE TO RELATED APPLICATIONS

This application is a continuation of International Application No. PCT/CN2010/078276, filed on Nov. 1, 2010, which claims priority to Chinese Patent Application No. 200910109941.8, filed on Oct. 31, 2009 and Chinese Patent Application No. 200910217199.2, filed on Dec. 31, 2009, all of which are hereby incorporated by reference in their entireties.

FIELD OF THE INVENTION

The present invention relates to the field of communications technologies, and in particular, to a method, an apparatus and a system for downlink channel transmission.

BACKGROUND OF THE INVENTION

In downlink service data transmission of LTE (Long Term Evolution, 3 GPP long-term Evolution), multiple MSs (Mobile Station, terminal mobile apparatus) in a cell dynamically multiplex time-frequency resources. Which time-frequency resources are occupied by a certain MS is indicated by PDCCH (Physical Downlink Control Channel, Physical Downlink Control Channel) information corresponding to the MS, and the PDSCH (Physical Downlink Shared Channel, Physical Downlink Shared Channel) of the MS and other signaling information are obtained through the PDCCH information.

Referring to FIG. 1, a distribution diagram of PDCCH information and PDSCH information in a sub frame is shown. The PDCCH information is generally located in the first 1-3 OFDM (Orthogonal Frequency Division Multiplexing Symbol, Orthogonal Frequency Division Multiplexing) Symbols in the sub frame, and the PDSCH of each MS in the current sub frame and other signaling are indicated through the PDCCH information.

In the LTE system, the PDCCH resource that needs to be intercepted by each MS changes dynamically. Before detection, the MS does not know whether and which PDCCH is delivered to itself, and therefore, all possible situations are required to be detected (referred to as blind detection) to obtain the PDCCH corresponding to the MS.

The MS detecting the PDCCH is performed in a search space, and the search space is classified into two types, where one type is CSS (Common Search Space, common search space), and the other type is DSS (Dedicated Search Space, dedicated search space). The CSS is a common search space, and PDCCH information included in the CSS is common information of a part of the MSs. The DSS is a dedicated search space for a certain MS, and information included in the DSS is only valid for a certain MS.

The PDCCH in the two types of search spaces, namely, CSS and DSS, has different encoded length AL (Aggregation Level, aggregation level). Referring to Table 1, a mapping table of PDCCH length and location in search space in a version of protocol (which is similar in situations of other versions). In the table, CCE (Control Channel Element, control channel element) is the minimum unit of resource occupied by the control channel, and one CCE is corresponding to 36 REs (Resource Element, resource element, the minimum allocation unit of resource).

TABLE 1

Mapping Table of PDCCH Length and Location in Search Space

| Type of Search Space | Information Length L Using CCE as an Unit After Encoding | The Number of PDCCH Location Candidates |
| --- | --- | --- |
| DSS | 1 | 6 |
|  | 2 | 6 |
|  | 4 | 2 |
|  | 8 | 2 |
| CSS | 4 | 4 |
|  | 8 | 2 |

It can be seen from the column of "the number of PDCCH location candidates" in the Table 1 that, the PDCCH location is not fixed, and therefore, when the blind detection is performed, the detection needs to be performed at different locations. Moreover, original information of the PDCCH information is DCI (Downlink Control Information, downlink control information), and as for several types of DCI format (DCI format) with the same length, detection may be performed through one-time convolutional decoding (such as Viterbi decoding). If DCI formats having different lengths exist, decoding is required for multiple times.

In the prior art, in order to reduce the amount of computation during the blind detection, several types of formats having similar lengths are compensated into formats having the same length by using zero padding method under a condition of reducing a part of the performance, so as to reduce the number of times of the decoding.

Referring to Table 2, a relationship table of DCI format type and the number of times of required detection in the search space is shown. DCI format 1C is a first type, and DCI format 0/1A/3/3A after the zero padding has the same length, and the several types of formats are classified into a second type. For a third type of formats DCI format 1/1B/1D/2/2A, the MS only needs to detect one of them according to a current transmission mode.

TABLE 2

DCI Format and the Number of Times of Detection in Corresponding Search Space

| Type | Detected DCI Format | CSS | DSS |
| --- | --- | --- | --- |
| Type 1 | DCI format 1C | 6 times | 0 times |
| Type 2 | DCI format 0/1A/3/3A | 6 times | 16 times |
| Type 3 | DCI format 1/1B/1D/2/2A | 0 times | 16 times |

It can be seen from Table 2 that, the type 1 format (DCI format 1C) information may only appear in the CSS, and therefore, detection is only needed to be performed in the CSS. Referring to Table 1, different location combinations corresponding to the PDCCH having different lengths after the encoding are totally 4+2=6 types, so detection is required to be performed for 6 times. Likewise, the type 2 format (DCI format 0/1A/3/3A) may appear in the CSS and may also appear in the DSS, so detection is required to be performed for 4+2(CSS)+6+6+2+2(DSS)=22 times. The type 3 format only appears in the DSS, so detection is required to be performed for 6+6+2+2=16 times. When blind detection is performed, convolutional decoding is required to be performed for at most 44 (6+22+16) times.

In the implementation of the present invention, the inventor finds that the prior art at least has the following defect:

When the blind detection is performed, multiple times (for example, 44 times) of convolutional decoding are required to be performed, and the amount of computation of convolutional computation in each decoding process is large, and therefore, the total amount of computation is large, thereby reducing the process efficiency.

SUMMARY OF THE INVENTION

Embodiments of the present invention provide a method, an apparatus and a system for downlink channel transmission, for reducing the amount of computation during blind detection.

A method for downlink channel transmission provided in an embodiment of the present invention includes:

sending physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information; and by sending the PDCCH information, obtaining, by a receiving end, the first part of the information after receiving the PDCCH, and verifying the first part of the information, if the verification is correct, obtaining the related parameter in the DCI content information in the second part of the information according to the indication information in the first part of the information, and performing convolutional decoding for specific DCI content information in the second part of the information according to the related parameter.

A method for downlink channel transmission further provided in an embodiment of the present invention includes:

receiving physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information; and obtaining the first part of the information, and verifying the first part of the information, if the verification is correct, obtaining the related parameter in the DCI content information in the second part of the information according to the indication information in the first part of the information, and performing convolutional decoding for specific DCI content information in the second part of the information according to the related parameter.

An apparatus for downlink channel transmission further provided in an embodiment of the present invention includes:

a sending unit, configured to send physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information; and by sending the PDCCH information, a receiving end is enabled to obtain the first part of the information after the receiving end receives the PDCCH, and verify the first part of the information, if the verification is correct, obtain the related parameter in the DCI content information in the second part of the information according to the indication information in the first part of the information, and perform convolutional decoding for specific DCI content information in the second part of the information according to the related parameter.

An apparatus for downlink channel transmission further provided in an embodiment of the present invention includes:

a receiving unit, configured to receive physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information;

an obtaining unit, configured to obtain the first part of the information; and a processing unit, configured to perform verification for the first part of the information, if the verification is correct, obtain the related parameter in the DCI content information in the second part of the information according to the indication information in the first part of the information, and perform convolutional decoding for specific DCI content information in the second part of the information according to the related parameter.

A system for downlink channel communication further provided in an embodiment of the present invention includes:

a sending node, configured to send physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information; and a receiving node, configured to, after receiving the PDCCH information, obtain the first part of the information, and perform verification for the first part of the information, if the verification is correct, obtain the related parameter in the DCI content information in the second part of the information according to the indication information in the first part of the information, and perform convolutional decoding for specific DCI content information in the second part of the information according to the related parameter.

The foregoing technical solutions have the following advantages: by receiving PDCCH information including DCI type information, first part of the information is obtained, and when the verification performed for the first part of the information is correct, convolutional decoding is performed for DCI content information according to the DCI type information, so as to reduce the number of times of convolutional decoding, thereby reducing the amount of computation and improving the process efficiency.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
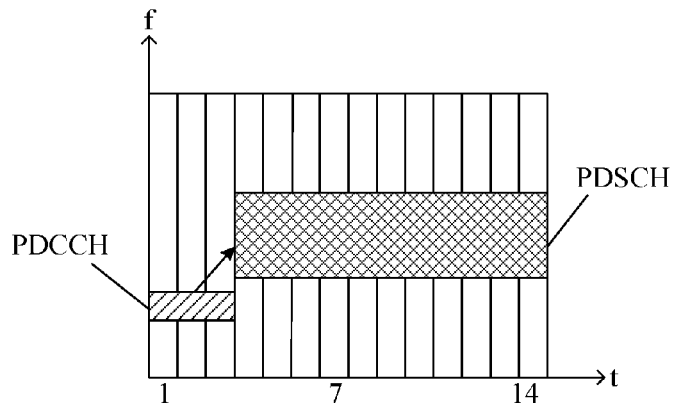
FIG. 1 is a schematic diagram of location of PDCCH information in a sub-frame.
Figure 2:
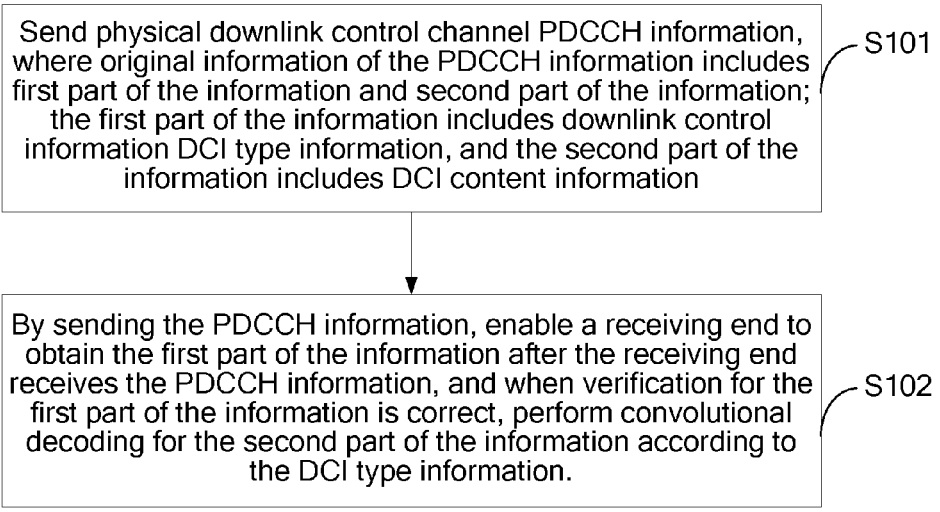
FIG. 2 is a flow chart of a method in Embodiment 1 of the present invention.

For better understanding of the objectives, technical solutions, and advantages of the present invention, the present invention is described in detail below with reference to specific embodiments and relevant accompanying drawings.

Embodiment 1

An embodiment of the present invention provides a method for downlink channel transmission, for reducing total amount of computation during blind detection, and improving the process efficiency.

The embodiment of the present invention includes the following steps:

S101: Send physical downlink control channel PDCCH information, where original information of the PDCCH information includes first part of the information and second part of the information; the first part of the information includes downlink control information DCI type information, and the second part of the information includes DCI content information; and S102: By sending the PDCCH information, a receiving end is enabled to obtain the first part of the information after the receiving end receives the PDCCH information, and perform convolutional decoding for the second part of the information according to the DCI type information when verification for the first part of the information is correct.

In the embodiment of the present invention, the first part of the information may further include aggregation level AL information and/or PDCCH location information. When the first part of the information includes the AL information and/or PDCCH information, and when the receiving end performs verification for the first part of the information, in addition to performing cyclic redundancy code detection (CRC) for the DCI type information, the receiving end further compares the AL information and/or PDCCH information with information corresponding to the detection to check whether the AL information and/or PDCCH information during the detection is equal to corresponding AL information and/or PDCCH information in the first part of the information, and if yes, the verification is correct.

When the PDCCH information is sent, encoding is performed for the first part of the information through a forward error correction FEC algorithm, and convolutional encoding is performed for the second part of the information.

The first part of the information is scrambled before encoding is performed for the first part of the information, or scrambled after encoding is performed for the first part of the information.

After the encoding and scrambling are performed, rate matching is performed for the first part of the information and the second part of the information.

Concatenation and interleaving are performed according to content obtained after rate matching.

The interleaved information is mapped to the PDCCH information for being sent.

In the embodiment of the present invention, by sending PDCCH information including DCI type information, a receiving end is enabled to obtain first part of the information, and when verification for the first part of the information is correct, perform convolutional decoding for DCI content information according to the DCI type information, so as to reduce the number of times of convolutional decoding, thereby reducing the amount of computation and improving the process efficiency.

Embodiment 2

Embodiment 2 of the present invention provides a method for downlink channel transmission, for reducing total amount of computation during blind detection, and improving the process efficiency.

During implementation of the embodiment of the present invention, physical downlink control channel PDCCH information is sent by a sending end, and the sending end may be a base station, or some intermediate relay (Relay) apparatuses.

Figure 3:
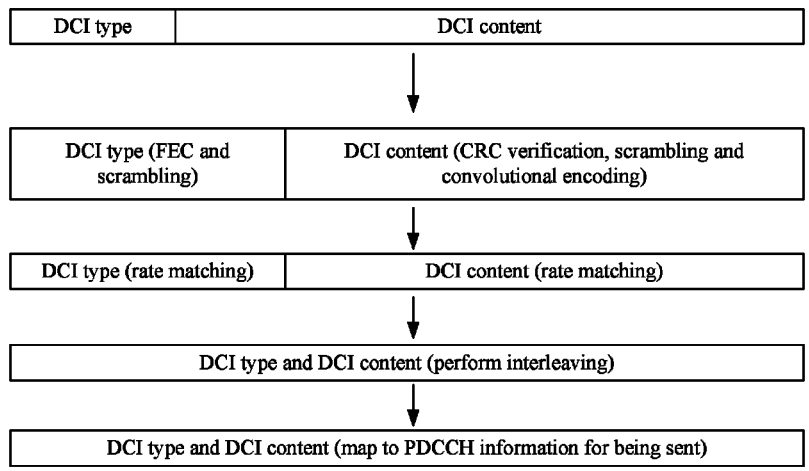
FIG. 3 is a schematic diagram of sending PDCCH information in Embodiment 2 of the present invention.

Referring to FIG. 3, a schematic diagram of sending PDCCH information by a sending end in an embodiment of the present invention is shown. It can be seen from FIG. 3 that, when the sending end sends the PDCCH information, original information includes two parts, one part is DCI type information, and the other part is DCI content information. FEC encoding and scrambling are performed for the DCI type information, and additional CRC verification, scrambling, and convolutional encoding are performed for the DCI content information. Rate matching is performed for the two parts of the information. Finally, Concatenation and interleaving are performed for the two parts, and the two parts are mapped to the PDCCH information for being sent.

Figure 4:
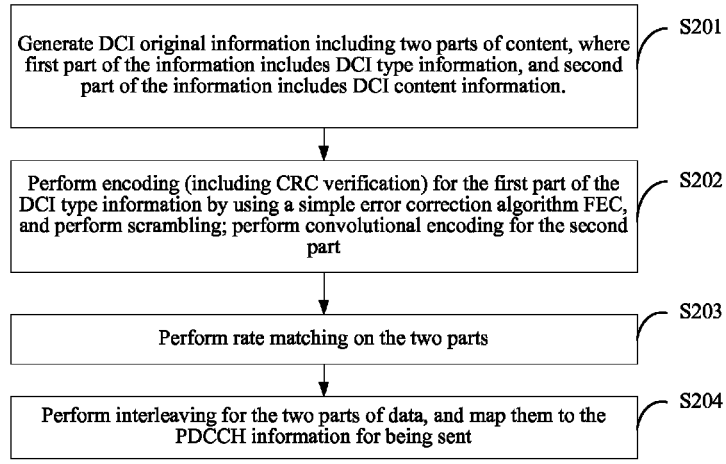
FIG. 4 is a flow chart of a sending end in Embodiment 2 of the present invention.
Figure 5:
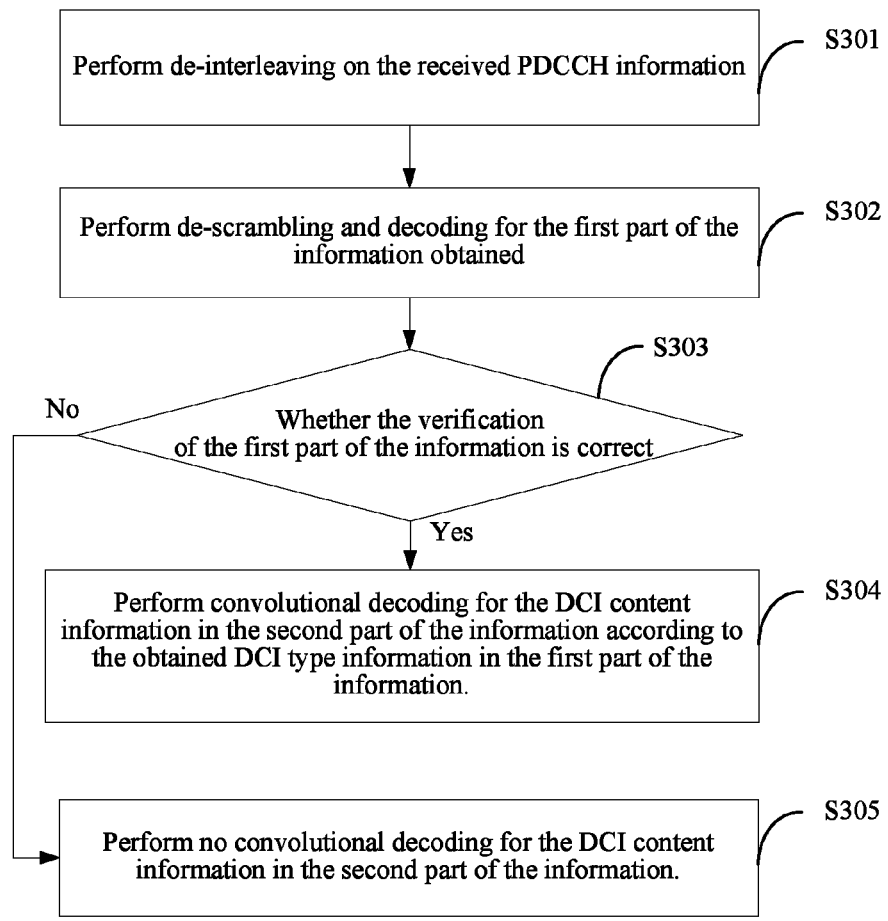
FIG. 5 is a flow chart of a receiving end in Embodiment 2 of the present invention.

Referring to FIG. 4, the sending, by the sending end, the PDCCH information may specifically include the following steps:

S201: Generate DCI original information including two parts of content, where first part of the information includes DCI type information, and second part of the information includes DCI content information.

The DCI content information here is real content that needs to be transmitted during the process of transmission, and the PDCCH information is a bearer of DCI content. Generally, DCI is required to be encoded and undergone other steps, and then mapped to the PDCCH information for being sent. In the embodiment of the present invention, in addition to the DCI content information, DCI type information also exists, for example, indicating the DCI is a type of 1/1A/3/3A or other types.

S202: Perform encoding (including CRC verification) for the first part of the DCI type information by using a simple error correction algorithm FEC, and perform scrambling; perform convolutional encoding for the second part.

User specific RNTI (Radio Network Temporary Identifier, radio network temporary identifier) may be used to scramble the first part of the information before or after the encoding is performed for the first part of the information. It should be noted that, when scrambling is performed with the RNTI, the scrambling may be performed before the encoding or after the encoding, and the time of performing the scrambling determines, when decoding is performed, whether to perform de-scrambling first and then decoding or perform decoding first and then de-scrambling. The processing for the second part of the information is similar to that in the prior art. For example, it is assumed that a DCI type is represented by 3 bits, that is, at most 8 types of DCI exist, then $g(x)=x4+x2+x+1$ may be used to perform (7,3) cyclic code encoding; or, a DCI type is represented by 4 bits, that is, at most 16 types of DCI exist, then $g(x)=x3+x+1$ may be used to perform (7,4) cyclic code encoding. At the same time, similar to the prior art, during the period of performing convolutional encoding for the second part, processes such as additional CRC verification and scrambling are further performed, and a specific procedure is not repeated herein.

S203: Perform rate matching for the two parts.

By performing rate matching for the two parts, a total length is corresponding to a PDCCH information resource. At the same time, it is ensured that the performances of the two parts are equal or the performance of the first part is slightly higher than that of the second part.

The rate matching refers to matching the size of data with the size of air interface resource that can be disposed, and when the former is smaller than the later, a part of bits of the former are repeated; otherwise, a drilling operation is performed, that is, some of the bits in the former are deleted.

S204: Perform concatenation and interleaving for the two parts of data, and then map them to the PDCCH information for being sent.

In the embodiment of the present invention, the receiving end is generally a user terminal (for example, a Mobile Station, MS), or some intermediate relay (Relay) apparatuses. The receiving end performs the following steps after receiving the PDCCH information sent by the sending end:

S301: Perform de-interleaving for the received PDCCH information, to obtain first part of the de-interleaved information.

Through the de-interleaving, the first part of the de-interleaved information sent by the sending end may be obtained.

S302: Perform de-rate matching for the first part of the de-interleaved information, and perform de-scrambling and decoding.

In the step S202, the scrambling may be completed before the encoding or after the encoding. If the scrambling is performed first and the encoding is then performed in the step S202, in the step S302, decoding is performed first, and de-scrambling is then performed by using the specific RNTI of the local MS; on the contrary, if the encoding is performed first and the scrambling is then performed in the step S202, in the step S302, de-scrambling is performed first, and decoding is then performed.

S303: Determine whether the verification for the first part of the information is correct; if correct, perform step S304; otherwise, perform step S305.

S304: Perform convolutional decoding for the DCI content information in the second part of the information according to the obtained DCI type information in the first part of the information.

It should be noted that, in step S202, additional CRC and scrambling are performed, so in step S302, processes such as CRC verification and de-scrambling need to be performed correspondingly, and a verification result is completed after the CRC verification is correct. The processes such as the CRC verification and the de-scrambling are techniques well-known by persons skilled in the art, and are not repeated herein.

S305: Do not perform convolutional decoding for the DCI content information in the second part of the information.

If the verification information to the first part is incorrect, it indicates that an error occurs in the data during the process of transmission, and therefore, the DCI content information in the second part of the information is no longer detected, so as to reduce the number of times of unnecessary convolutional decoding, thereby improving the process efficiency.

In the embodiment of the present invention, when the PDCCH information is sent, the original DCI information includes the DCI type information and the DCI content information. After receiving the PDCCH information, the sending end first obtains the first part of the information, and verifies the first part of the information, if the verification is correct, performs operations such as convolutional decoding for the DCI content in the second part of the information according to the DCI type information in the first part; if the verification is not correct, does not perform convolutional decoding for the content of the second part. The DCI type information is known, and therefore, the convolutional decoding may be performed for the second part according to the obtained DCI type information, thereby avoiding the problem of performing multiple times of convolutional decoding in a search space due to that the type information is unknown. By taking a DSS search space as an example, the DSS search space at most transmits several pieces of PDCCH information (the specific number of pieces depends on a protocol version and is, for example, 3 or 4), each PDCCH information corresponds to a type of format, and therefore, the convolutional decoding is only required to be performed for several formats, thereby greatly reducing the amount of computation, and improving the process efficiency.

It should be noted that, when decoding operation is performed for the first part of the information, decoding may still be performed for at most 44 times, but the decoding algorithm for this part is simple, so the amount of computation is far less than the amount of computation of the convolutional decoding for the second part. By considering that the amount of computation of the second part has been reduced greatly, the total amount of computation is reduced greatly for the two parts, thereby improving the process efficiency and reducing the apparatus power consumption.

At the same time, the embodiment of the present invention does not need to perform zero-padding operation, so in addition to reducing performance loss, the DCI format may also be expanded more conveniently, thereby increasing the flexibility of DCI format design. If a new DCI format needs to be expanded, information of the format is added in the DCI type information in the embodiment of the present invention, and decoding is performed for the DCI content information in the second part of the information according to the type information, thereby avoiding the problem of multiple times of detection required in blind detection, so as to implement the expansion application of the DCI format more conveniently.

Embodiment 3

An embodiment of the present invention provides a method for downlink channel transmission, for reducing total amount of computation during blind detection, and improving the process efficiency.

Figure 6:
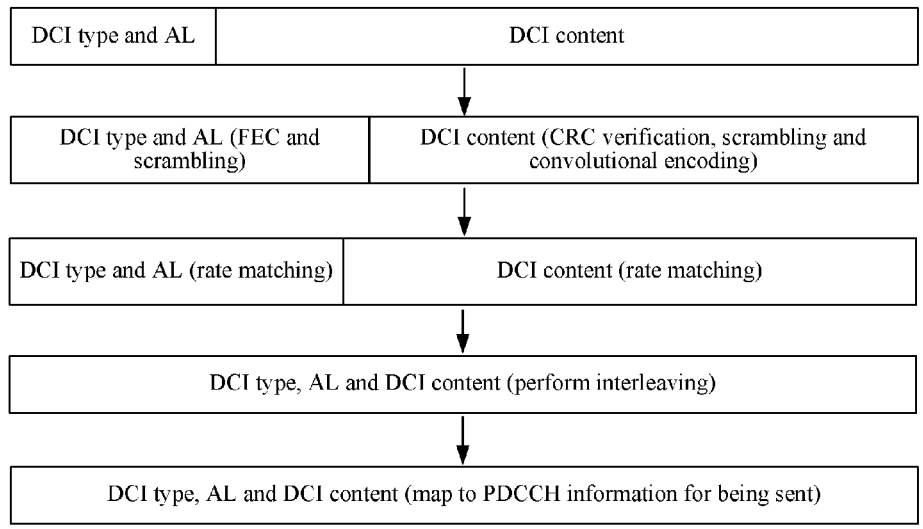
FIG. 6 is a schematic diagram of sending PDCCH information in Embodiment 3 of the present invention.

Referring to FIG. 6, a schematic diagram of sending PDCCH information by a sending end in an embodiment of the present invention, the embodiment of the present invention is similar to the Embodiment 2, and when the sending end sends the PDCCH information, the original information also includes two parts, where, in addition to the DCI type information, the first part of the information may also be added with AL (CCE is used as the length of a unit after DCI encoding) information, and the other part is the same as that in the Embodiment 2, that is, the DCI content information. Then, FEC encoding and scrambling are performed for the DCI type information and the AL information, and convolutional encoding is performed for the DCI content information. Rate matching is performed for the two parts of the information. Finally, concatenation and interleaving are performed for the two parts, and then the two parts of the information is mapped to the PDCCH information for being sent.

Figure 7:
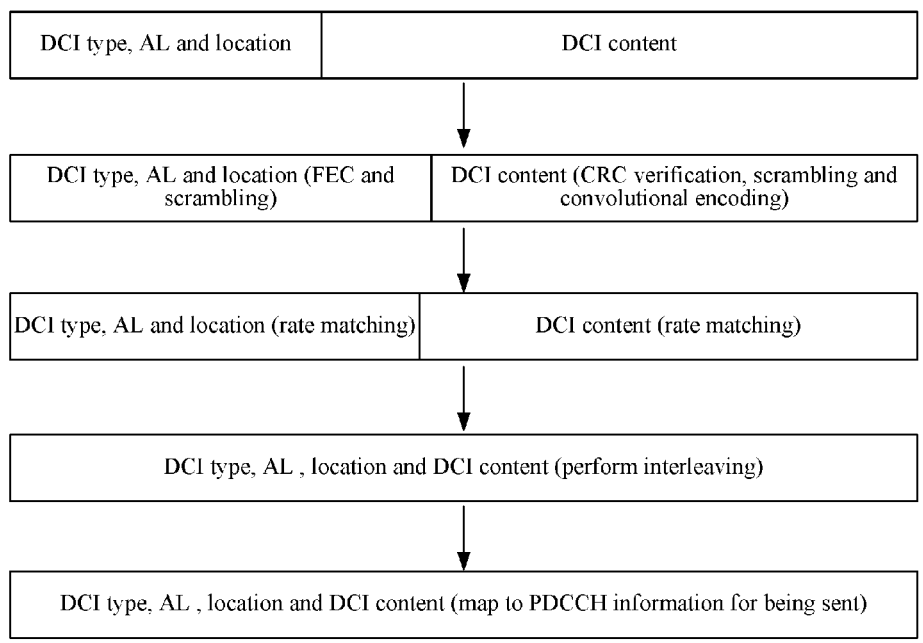
FIG. 7 is a schematic diagram of sending PDCCH information in another embodiment of the present invention.

The AL information in the embodiment of the present invention may also be replaced with location information representing a PDCCH candidate location, or both the AL information and the location information are included. Referring to FIG. 7, a schematic diagram of the original information including both the DCI type information and the AL information and location information when the sending end sends the original information in another embodiment of the present invention is shown. Similar to the processing flow of the sending end in the Embodiment 2, FEC encoding and scrambling are performed for the DCI type information, the AL information and the location information, and convolutional encoding is performed for the DCI content information. Then rate matching is performed for the two parts of the information. Finally, concatenation and interleaving are performed for the two parts, and the two parts of the information are mapped to the PDCCH information for being sent.

In the embodiment of the present invention, after receiving the PDCCH information, similar to the Embodiment 2, the receiving end first obtains the two parts of the information through de-interleaving, performs de-rate matching for the first part of the information, and then performs de-scrambling and decoding. Then, the receiving end performs CRC verification for the first part of the information, if the verification is correct, and the AL information (or location information, or AL information and location information) is also equal to information corresponding to the detection (for example, in the detection, detection is performed on a situation that the AL is equal to 8 CCEs, and the AL information obtained through the detection is also 8 CCEs), performs convolutional decoding operation for the second part, otherwise, does not perform the convolutional decoding operation for the second part.

In the embodiment of the present invention, after the AL information (or location information) is added, in addition to the advantages listed in the Embodiment 2 such as reducing the amount of computation, improving the process efficiency, reducing the apparatus power consumption, and being easy to be expanded, when the verification is performed for the first part, the AL information and/or location information needs to be correct in addition to that the CRC verification needs to be correct, so the verification process is more strict, thereby further improving the reliability of the verification.

Embodiment 4

Embodiment 1 of the present invention provides a method for downlink channel transmission, for reducing total amount of computation during blind detection, and improving the process efficiency.

Figure 8:
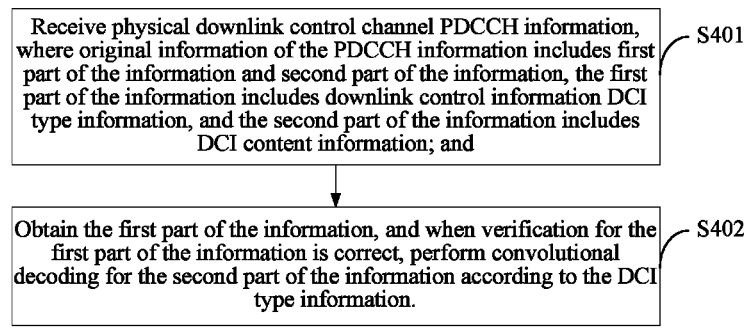
FIG. 8 is a flow chart of Embodiment 4 of the present invention.

Referring to FIG. 8, the embodiment of the present invention includes the following steps:

S401: Receive physical downlink control channel PDCCH information, where original information of the PDCCH information includes first part of the information and second part of the information, the first part of the information includes downlink control information DCI type information, and the second part of the information includes DCI content information; and S402: Obtain the first part of the information, and when verification for the first part of the information is correct, perform convolutional decoding for the second part of the information according to the DCI type information.

The first part of the information may further include aggregation level AL information and/or PDCCH location information.

In the embodiment of the present invention, the obtaining the DCI type information in the first part of the information includes:

performing de-interleaving for the PDCCH information, to obtain the first part of the de-interleaved information;

performing de-rate matching for the first part of the de-interleaved information;

according to an order of performing encoding and scrambling for the first part of the information, performing decoding first and then de-scrambling, or performing de-scrambling first and then decoding; and obtaining the first part of the information according to results of the de-scrambling and the decoding.

In the embodiment of the present invention, the performing the verification for the first part of the information includes:

when the first part of the information includes DCI information, performing CRC verification (cyclic redundancy code verification) for the DCI type information;

when the determining the first part of the information further includes the AL information and/or the PDCCH location information, in addition to performing the cyclic redundancy code verification for the DCI type information, further determining whether the AL information and/or the PDCCH location information is the same as information corresponding to the detection. By determining whether the AL information and/or the PDCCH location information is the same as the information corresponding to the detection, the reliability of the verification may be further improved.

The embodiment of the present invention further includes the following steps:

before performing convolutional decoding for the second part of the information, performing de-rate matching for the interleaved content; and according to the order of performing the encoding and scrambling for the first part of the information, performing de-scrambling before decoding or after decoding, and finally verifying whether the first part of the information obtained is correct through CRC.

For the specific execution method in the embodiment of the present invention, reference may be made to the related steps in Embodiment 3, and details are not repeated herein.

In the embodiment of the present invention, by receiving the PDCCH information including the DCI type information, the first part of the information is obtained, and when the verification for the first part of type information is correct, convolutional decoding is performed for the DCI content information according to the DCI type information, to reduce the number of times of convolutional decoding, thereby reducing the amount of computation, and improving the process efficiency. At the same time, through the verification for the first additional information, the reliability of the verification may be further improved.

Embodiment 5

Figure 9:
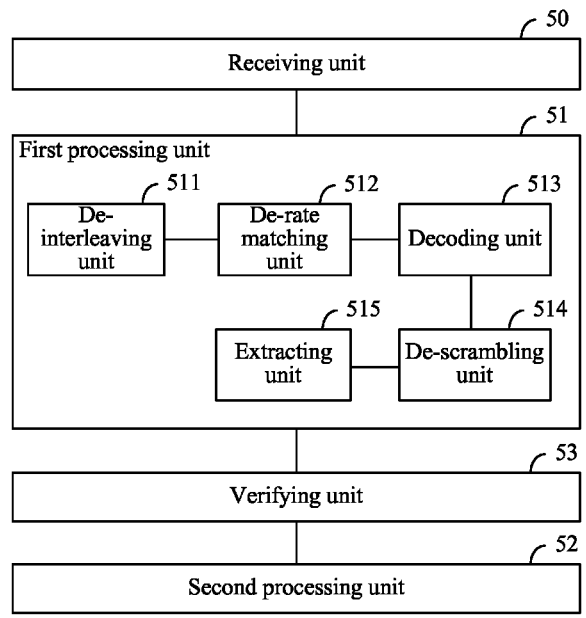
FIG. 9 is a schematic structural diagram of an apparatus in Embodiment 5 of the present invention.

Referring to FIG. 9, an embodiment of the present invention provides an apparatus for downlink channel detection, which includes:

a receiving unit 50, configured to receive physical downlink control channel PDCCH information, where original information of the PDCCH information includes first part of the information and second part of the information; the first part of the information includes downlink control information DCI type information, and the second part of the information includes DCI content information;

a first processing unit 51, configured to obtain the first part of the information;

a verifying unit 52, configured to perform verification for the first part of the information; and a second processing unit 53, configured to, when the verification for the first part of the information performed by the verifying unit is correct, perform convolutional decoding for the second part of the information according to the DCI type information.

The first part of the information may further include aggregation level AL information and/or PDCCH location information.

In the embodiment of the present invention, the first processing unit 51 includes:

a de-interleaving unit 511, configured to perform de-interleaving for the PDCCH information, to obtain the first part of the de-interleaved information;

a de-rate matching unit 512, configured to perform de-rate matching for the first part of the de-interleaved information, to obtain the first part of information obtained after de-rate matching;

a decoding unit 513, configured to perform decoding for the first part of the information after the de-rate matching;

a de-scrambling unit 514, configured to perform de-scrambling for the first part of the information after de-rate matching, where the de-scrambling may be performed, according to the order of performing encoding and scrambling for the first part of the information, before decoding or after decoding; and an obtaining unit 515, configured to obtain the first part of the information according to processing results of the decoding unit and the de-scrambling unit.

The verifying unit 52 is further configured to:

when the first part of the information includes DCI information, perform, by the verifying unit 52, cyclic redundancy code verification for the DCI type information;

when the determining the first part of the information further includes the AL information and/or the PDCCH location information, in addition to performing the cyclic redundancy code verification for the DCI type information, further determine whether the AL information and/or the PDCCH location information is the same as information corresponding to the detection. By determining whether the AL information and/or the PDCCH location information is the same as the information corresponding to the detection, the reliability of the verification may be further improved.

In the embodiment of the present invention, the apparatus may be a user terminal, or an intermediate relay (Relay) node apparatus.

Each unit above may be implemented by using a universal processor, may also be implemented by using a dedicated processor or other hardware processing units. Meanwhile, several units may be implemented by using the same processor, or several units are implemented by using different processors, which is not limited herein.

Moreover, when each unit executes the foregoing specific steps, reference may be made to related steps in Embodiment 2, and details are not repeated herein.

In the embodiment of the present invention, by receiving the PDCCH information including the DCI type information, the first part of the information is obtained, and when the verification for the first part of type information is correct, convolutional decoding is performed for the DCI content information according to the DCI type information, to reduce the number of times of convolutional decoding, thereby reducing the amount of computation, and improving the process efficiency. At the same time, through the verification for the first additional information, the reliability of the verification may be further improved.

Embodiment 6

Figure 10:
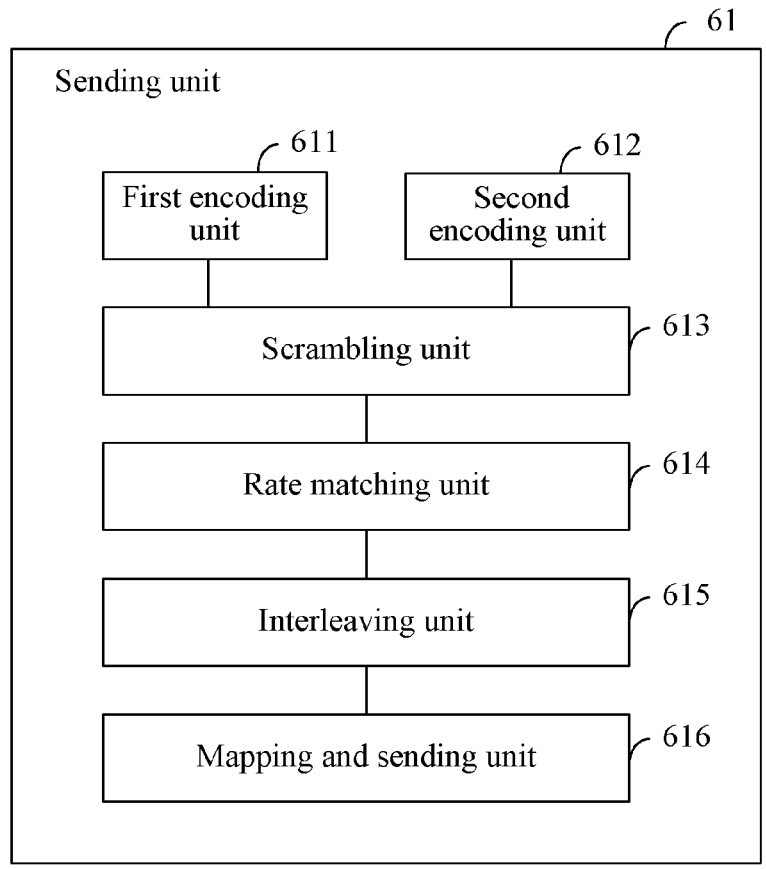
FIG. 10 is a schematic structural diagram of an apparatus in Embodiment 6 of the present invention.

Referring to FIG. 10, an embodiment of the present invention provides an apparatus for downlink channel transmission, which includes:

a sending unit 61, configured to send physical downlink control channel PDCCH information, where original information of the PDCCH information includes first part of the information and second part of the information; the first part of the information includes downlink control information DCI type information, and the second part of the information includes DCI content information;

by sending the PDCCH information, a receiving end is enabled to obtain the DCI type information in the first part of the information after the receiving end receives the PDCCH information, and perform convolutional decoding for the DCI content information according to the DCI type information.

The first part of the information may further include AL information and/or PDCCH location information.

In the embodiment of the present invention, the sending unit 61 includes:

a first encoding unit 611, configured to perform encoding for the first part of the information through a forward error correction FEC algorithm;

a second encoding unit 612, configured to perform convolutional encoding for the second part of the information;

a scrambling unit 613, configured to perform scrambling for the first part of the information before the encoding, or perform scrambling after the encoding; where the scrambling may be performed by using specific RNTI of a user; and a rate matching unit 614, configured to perform rate matching for the first part of the information and the second part of the information; where through the rate matching, a total length is enabled to be corresponding to a PDCCH information resource;

it should be noted that, before the rate matching is performed for the second part of the information, processes such as CRC verification and scrambling performed for the second part of the information are further included; the processes are similar to those in the prior art, and are not repeated herein;

an interleaving unit 615, configured to perform concatenation and interleaving for the content obtained after rate matching performed by the rate matching unit 614; and a mapping and sending unit 616, configured to mapping information interleaved by the interleaving unit to the PDCCH information for being sent.

In the embodiment of the present invention, the performing verification for the first part of the information includes:

when the first part of the information includes the DCI information, performing CRC verification (cyclic redundancy code verification) for the DCI type information;

when the determining the first part of the information further includes the AL information and/or the PDCCH location information, in addition to performing the cyclic redundancy code verification for the DCI type information, further determining whether the AL information and/or the PDCCH location information is the same as information corresponding to the detection. By determining whether the AL information and/or the PDCCH location information is the same as the information corresponding to the detection, the reliability of the verification may be further improved.

In the embodiment of the present invention, the apparatus may be a base station, or an intermediate relay (Relay) node apparatus.

Each unit above may be implemented by using a universal processor, may also be implemented by using a dedicated processor or other hardware processing units. Meanwhile, several units may be implemented by using the same processor, or several units are implemented by using different processors, which is not limited herein.

Moreover, when each unit executes the foregoing specific steps, reference may be made to the related steps in Embodiment 2, and details are not repeated herein.

In the embodiment of the present invention, by sending the PDCCH information including the DCI type information, the receiving end is enabled to obtain the first part of the information, and when the verification for the first part of the information is correct, convolutional decoding is performed for the DCI content information according to the DCI type information, to reduce the number of times of convolutional decoding, thereby reducing the amount of computation and improving the process efficiency.

Embodiment 7

Figure 11:
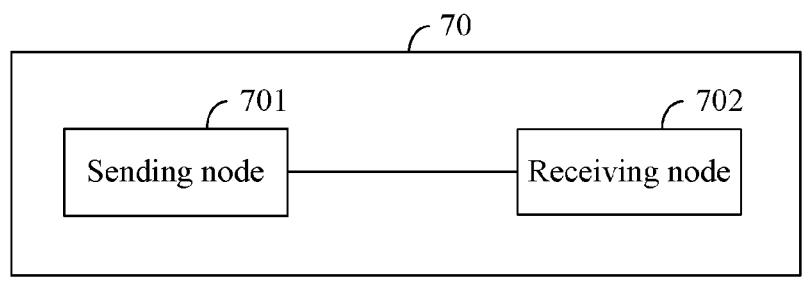
FIG. 11 is a schematic diagram of a communication system in Embodiment 7 of the present invention.

Referring to FIG. 11, a system 70 for downlink channel communication further provided in an embodiment of the present invention includes:

a sending node 71, configured to send a node, configured to send physical downlink control channel PDCCH information, where original information of the PDCCH information includes first part of the information and second part of the information; the first part of the information includes downlink control information DCI type information, and the second part of the information includes DCI content information; and a receiving end 72, configured to receive the PDCCH information sent by the sending node, obtain the first part of the information, and when verification for the first part of the information is correct, perform convolutional decoding for the second part of the information according to the DCI type information.

The first part of the information may further include aggregation level AL information and/or PDCCH location information.

In the embodiment of the present invention, the sending node 71 is further configured to, when sending the PDCCH information, perform encoding for the first part of the information through a forward error correction FEC algorithm, and perform convolutional encoding for the second part of the information;

perform scrambling and rate matching for the first part of the information and second part of the information; and perform concatenation and interleaving for the content after the rate matching, and map the content to the PDCCH information for being sent.

The receiving node 72 is further configured to, perform de-interleaving for the received PDCCH information, to obtain the first part of the information;

perform de-rate matching for the first part of the information; and perform de-scrambling and decoding for the first part of the information, to obtain the first part of the information.

It should be noted that, before the rate matching is performed for the second part of the information, processes such as CRC verification and scrambling performed for the second part of the information are further included; the processes are similar to those in the prior art, and are not repeated herein.

In the embodiment of the present invention, the performing verification for the first part of the information includes:

when the first part of the information includes the DCI information, performing CRC verification (cyclic redundancy code verification) for the DCI type information;

when the determining the first part of the information further includes the AL information and/or the PDCCH location information, in addition to performing the cyclic redundancy code verification for the DCI type information, further determining whether the AL information and/or the PDCCH location information is the same as information corresponding to the detection. By determining whether the AL information and/or the PDCCH location information is the same as the information corresponding to the detection, the reliability of the verification may be further improved.

In the embodiment of the present invention, the sending node 71 may be a base station, or a relay (Relay) apparatus; and the receiving unit may be a user terminal, or may also be a relay (Relay) apparatus.

In the embodiment of the present invention, the sending node sends the PDCCH information including the DCI type information, so that the receiving node obtains the first part of the information, and when the verification for the first part of type information is correct, convolutional decoding is performed for the DCI content information according to the DCI type information, to reduce the number of times of convolutional decoding, thereby reducing the amount of computation, and improving the process efficiency.

Embodiment 8

An embodiment of the present invention, based on the foregoing embodiments, provides a method for downlink channel transmission. On the basis of the foregoing embodiments in which the first part of the information only includes the DCI type information, the first part of the information in the embodiment of the present invention may further include bandwidth information and information about the number of transmission antenna ports, for reducing the total amount of computation during blind detection, and improving the process efficiency.

Figure 12:
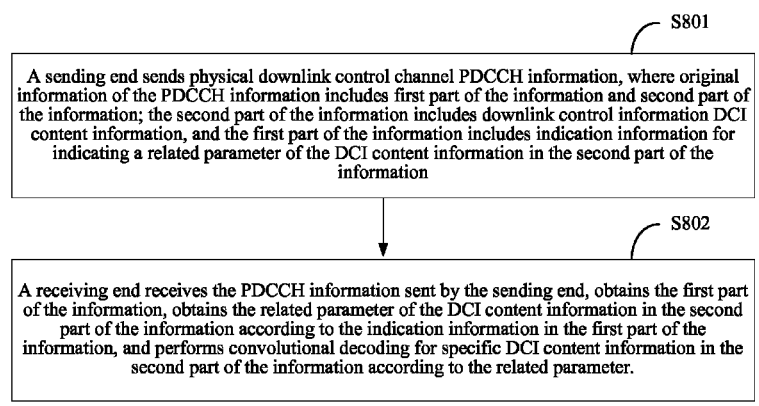
FIG. 12 is a schematic flow chart of Embodiment 8 of the present invention.

Referring to FIG. 12, the embodiment of the present invention includes the following steps:

S801: A sending end sends physical downlink control channel PDCCH information, where original information of the PDCCH information includes first part of the information and second part of the information; the second part of the information includes downlink control information DCI content information, and the first part of the information includes indication information for indicating a related parameter of the DCI content information in the second part of the information;

where the indication information includes part or all combinations of DCI type information, bandwidth information, and information about the number of transmission antenna ports, and the related parameter may be a DCI content length.

The indication information indicates or decides the related parameter, that is to say, the related parameter may be determined through the indication information. For example, in the embodiment of the present invention, the DCI content length may be indicated through part or all combinations of DCI type information, bandwidth information, and information about the number of transmission antenna ports, specifically:

The DCI type information is used to represent which type of DCI format is adopted, and a probable DCI content length may be learned according to the obtained DCI format, so that when convolutional decoding is performed for the second part subsequently, the convolutional decoding is performed only for specific DCI content information confirming to a specific probable DCI content length;

The bandwidth information may also be used to indicate a DCI content length. Under the same DCI format, if bandwidth is different, the number of bits used in resource indication domains in the DCI is different, a final DCI content length may also be different. For example, it is assumed that the DCI format is DCI_1A, which is x bits when the bandwidth is 20 MHz, and is x-8 bits when the bandwidth is 1.4 MHz; then, a specific DCI content length may be obtained according to the bandwidth information, so that when decoding is performed for the second part of the information subsequently, the convolutional decoding is performed only for the specific DCI content information confirming to the specific DCI content length.

Likewise, the number of the transmission antenna ports may also be used to indicate a DCI content length. For example, for the DCI with the format of DCI_2, the DCI with 4 transmission antenna ports has 3 more bits than the DCI with 2 transmission antenna ports. Subsequently, the convolutional decoding may be performed, according to probable DCI content lengths indicated by the number of the antenna ports, for the specific DCI content information confirming to the lengths.

The indication information in the first part may be any piece of, or any combination of multiple pieces of DCI type information, bandwidth information, and information about the number of transmission antenna ports; for example, both the DCI type information and the bandwidth information may be used.

The related parameter is the DCI content length in the embodiment of the present invention, and may be adjusted appropriately according to a specific situation during actual use.

S802: The receiving end receives the PDCCH information sent by the sending end, obtains the first part of the information, and obtains the related parameter of the DCI content information in the second part of the information according to the indication information in the first part of the information, and performs convolutional decoding for specific DCI content information in the second part of the information according to the related parameter.

The specific DCI content information herein refers to the DCI content information determined according to the related parameter, for example, when the related parameter is the DCI content length, the specific DCI content information is DCI content information satisfying a specific DCI content length.

Through the indication information in the first part, the receiving end may learn the related parameter (such as, the DCI content length), for example, when the indication information in the first part of the information is information of a DCI format, and it is assumed that the DCI format is DCI_1, and a length corresponding to DCI_1 is x or y (assuming that only two lengths exist, that is, x or y). When convolutional decoding is performed, the convolutional decoding may be performed only for the part of the DCI content information with the specific DCI content length.

Likewise, when the indication information in the first part of the information is the bandwidth information or the information about the number of transmission antenna ports, the DCI content length information may also be determined according to the information, so as to perform, through the DCI content length, the convolutional decoding for the DCI content information confirming to the DCI content length.

If the indication information in the first part of the information obtained includes multiple pieces, the pieces of indication information may be combined to perform the convolutional decoding for the DCI content information. For example, when the indication information is the DCI type information and the bandwidth information, the DCI type, such as DCI_1A, may be obtained first. It is assumed that the DCI_1A has two kinds of lengths, and at this time, if no bandwidth information exists, the kinds of lengths need to be detected one by one. When the indication information further includes the bandwidth information, which one or more kinds of DCI content lengths are specifically corresponding to the bandwidth information may be determined, thereby directly performing detection for DCI content information confirming to the DCI content length. Compared with a situation in which the DCI type information only exists, detection location for specific content may be more accurate, so that the number of times of convolutional decoding required is less, thereby improving the efficiency of blind detection.

In the embodiment of the present invention, the first part of the information and second part of the information are original information of the PDCCH information, and during the process that the information is finally mapped to the PDCCH information for being sent, several further processes are required, which include:

encoding: for example, performing encoding by using a simple encoding algorithm with an error correction function, such as by using FEC encoding (including error correction function) or other encoding with similar function;

adding user feature information: in order to enable the receiving end to learn whether the PDCCH is sent to the receiving end itself, some user feature information may be added, for example, some bits may be attached additionally, or the user feature information may be added by performing scrambling or other means;

rate matching: through rate matching, the total length of last two parts of information is corresponding to a PDCCH information resource;

where the user feature information may be added before the encoding, or may also be added after the encoding; may be added before the rate matching, and may also be added during the rate matching or during other steps, as long as users may be differentiated.

Figure 13:
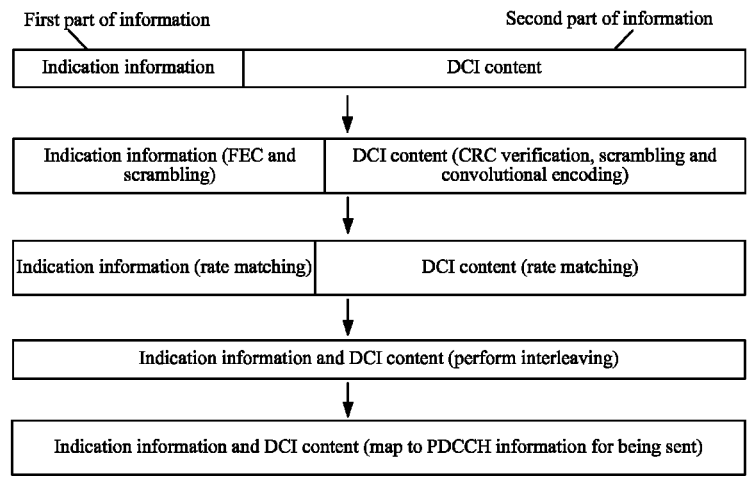
FIG. 13 is a schematic diagram of sending PDCCH information in Embodiment 8 of the present invention.

Referring to FIG. 13, a schematic flow chart of an embodiment of the present invention is shown. The original information of the PDCCH includes first part of the information and second part of the information; the first part of the information includes indication information, and the second part of the information includes DCI content information. When the information is required to be mapped to the PDCCH information for being transmitted, simple encoding (such as FEC, including the error correction function) is performed for the first part of the information, user feature information is added (for example, by using scrambling operation herein) and then rate matching is performed for the first part of the information. The scrambling may be performed before the encoding or after the encoding, or before the rate matching or after the rate matching, or during other steps, which is not limited in the present invention, as long as users may be differentiated. The DCI content information in the second part of the information may be operated according to a conventional method, for example, steps such as CRC verification, convolutional encoding, and adding user feature information (such as scrambling) are first performed, and then rate matching or the like is performed, or the order of performing the steps may also be adjusted, and details are not repeated herein. After the rate matching is performed, the two parts of the information are interleaved, and then mapped to the PDCCH information for being sent.

The processing operation of the receiving end is equivalent to the counter operation of the sending end, and includes: first performing de-interleaving, to obtain the first part of the information obtained after the user feature information is added to the first part of the information and encoding and rate matching are performed for the first part of the information. Then, according to results of verifying the user feature information and decoding for the first information, the first part of the information is obtained. Specifically, whether the received PDCCH is related to a local user is determined through de-rate matching and verification for the user feature information (such as de-scrambling), and whether a result is correct is determined through decoding (including the CRC detection), if correct, the first part of the information may be obtained to perform convolutional decoding for the specific DCI content of the second part; if not correct, convolutional decoding is not performed for the second part of the information, thereby reducing the number of times of convolutional decoding performed for the second part of the information.

The first part of the information may further include aggregation level AL information and/or PDCCH location information. When the first part of the information includes the AL information and/or PDCCH location information, and the receiving end performs verification for the first part of the information, in addition to performing cyclic redundancy code detection (CRC) for the first part of the information, further compares the AL information and/or PDCCH location information with information corresponding to the detection to check whether the AL information and/or PDCCH location information during the detection is equal to the corresponding AL information and/or PDCCH location information in the first part of the information, and if equal, the verification is correct.

Figure 14:
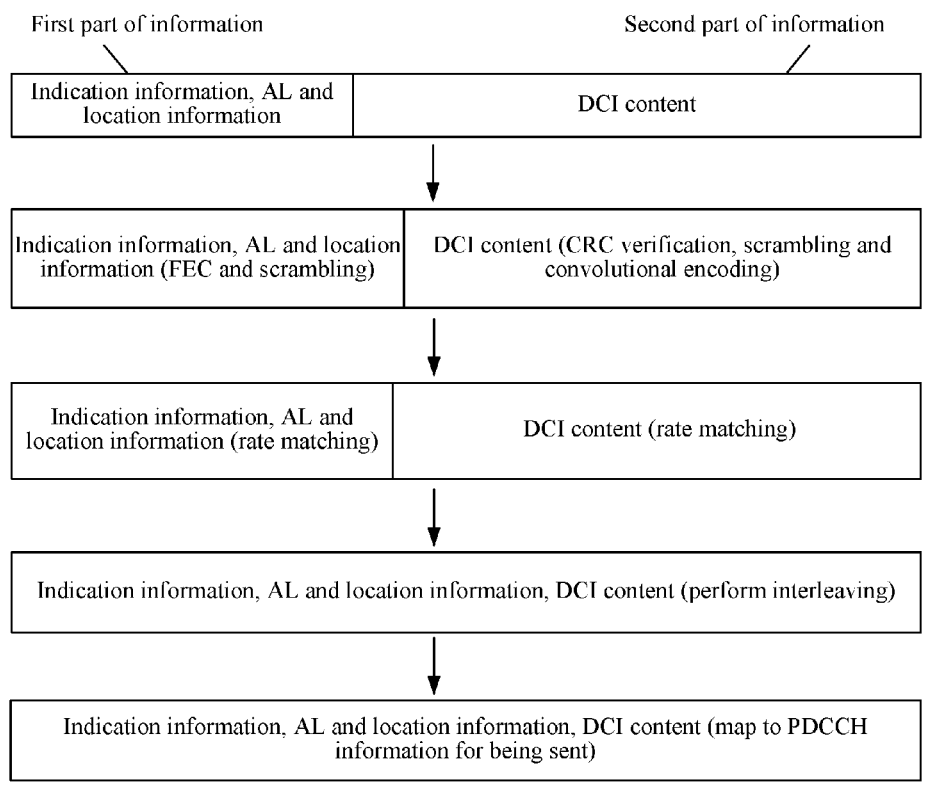
FIG. 14 is another schematic diagram of sending PDCCH information in Embodiment 8 of the present invention.

Referring to FIG. 14, a processing flow chart of adding the AL and the location information in the first part of the information in an embodiment of the present invention is shown. When the information is required to be mapped to the PDCCH for being transmitted, similar to the first part of the information only including the indication information in FIG. 13, simple encoding such as FEC is first performed, user feature information is added and then rate matching is performed for the first part of the information (including the indication information, the AL information and/or the location information). The adding the user feature information may be performed before the encoding or after the encoding, or before the rate matching or after the rate matching, or during other steps, which is not limited in the present invention, as long as users may be differentiated. Processes such as CRC verification, scrambling, convolutional encoding, and rate matching may be performed for the second part by using a conventional method. The two parts of the information are then interleaved, and finally mapped to the PDCCH information for being sent.

In the embodiment of the present invention, the PDCCH includes two parts of information, where the first part of the information includes the indication information for indicating a related parameter of the DCI content information in the second part of the information, for example, indicating the DCI type of the second part of the information. The receiving end first performs decoding (verification) for the first part of the information, and if the decoding is successful, performs decoding for the second part according to a related parameter obtained through decoding; if the decoding for the first part of the information is failed, does not perform decoding for the second part. In most PDCCH detection performed by an MS, only few of them are sent to a local MS (by taking LTE Rel-8 as an example, among 32 times of PDCCH detections performed by the MS in a dedicated search space, at most 2 of them are sent to the local MS), and therefore, the decoding performed for the first part of the information in most PDCCH detection is not successful, so that there is no need to perform corresponding decoding for the second part of the information, thereby greatly reducing the corresponding amount of computation and power consumption, and greatly reducing the complexity and cost of hardware required.

Embodiment 9

Figure 15:
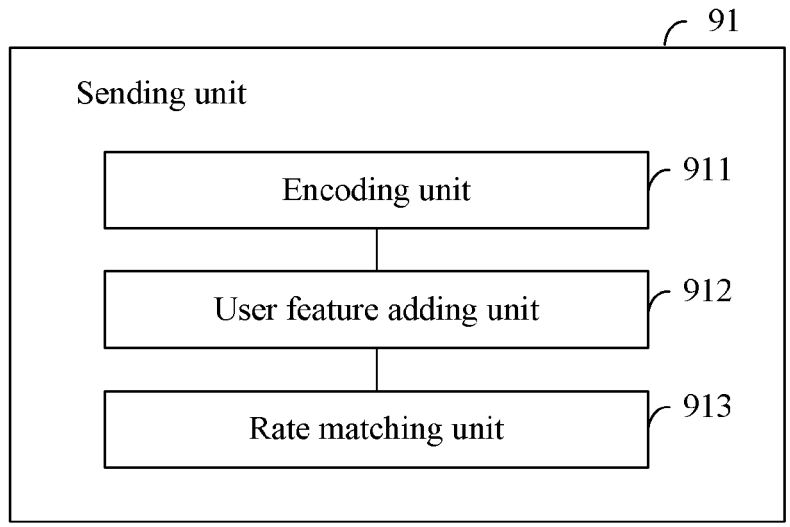
FIG. 15 is a schematic structural diagram of an apparatus in Embodiment 9 of the present invention.

Referring to FIG. 15, an embodiment of the present invention provides an apparatus for downlink channel transmission, which includes:

a sending unit 91, configured to send physical downlink control channel PDCCH information, where original information of the PDCCH information includes first part of the information and second part of the information; the second part of the information includes downlink control information DCI content information, and the first part of the information includes indication information for indicating a related parameter in the DCI content information in the second part of the information; and by sending the PDCCH information, a receiving end is enabled to obtain the first part of the information after the receiving end receives the PDCCH, obtain the related parameter of the DCI content information in the second part of the information according to the indication information in the first part of the information, and perform convolutional decoding for specific DCI content information in the second part of the information according to the related parameter.

The indication information includes part or all combinations of DCI type information, bandwidth information, and information about the number of transmission antenna ports, and the related parameter includes a DCI content length.

The sending unit further includes:

an encoding unit 911, configured to perform encoding for the first part of the information;

a user feature adding unit 912, configured to add user feature information to the first part of the information; and a rate matching unit 913, configured to perform rate matching for the first part of the information.

In the embodiment of the present invention, the apparatus may be a base station, or an intermediate relay (Relay) node apparatus.

In the embodiment of the present invention, by sending the PDCCH information including the indication information, the receiving end is enabled to obtain the first part of the information, obtain the related parameters of the DCI content information in the second part of the information according to the indication information in the first part of the information, and perform, according to the related parameters, convolutional decoding only for specific DCI content information that confirms to the related parameters and is in the second part of the information, without the need of performing convolutional decoding for all DCI content information, to reduce the number of times of convolutional decoding, thereby reducing the amount of computation and improving the process efficiency.

Embodiment 10

Figure 16:
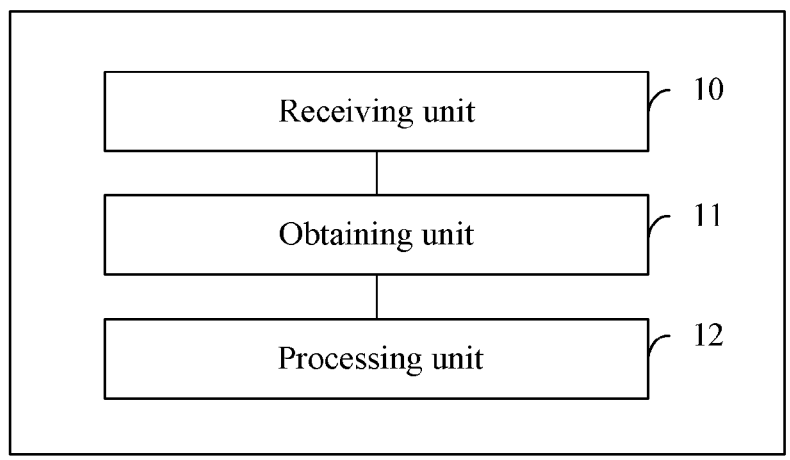
FIG. 16 is a schematic structural diagram of an apparatus in Embodiment 10 of the present invention.
Figure 17:
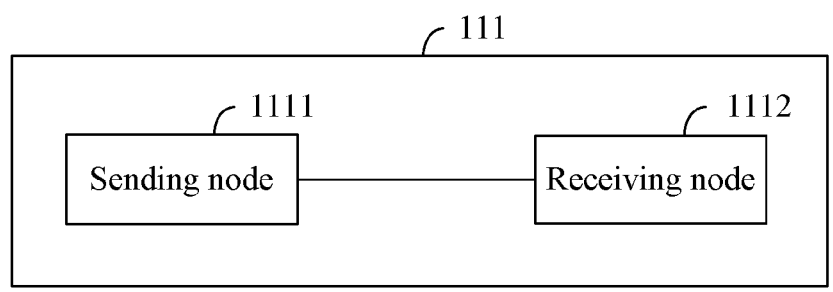
FIG. 17 is a block diagram of a system in Embodiment 10 of the present invention.

Referring to FIG. 16, an embodiment of the present invention provides an apparatus for downlink channel transmission, which includes:

a receiving unit 10, configured to receive physical downlink control channel PDCCH information, where original information of the PDCCH information includes first part of the information and second part of the information; the second part of the information includes downlink control information DCI content information, and the first part of the information includes indication information for indicating a related parameter of the DCI content information in the second part of the information;

an obtaining unit 11, configured to obtain the first part of the information; and a processing unit 12, configured to, according to the indication information in the first part of the information, obtain the related parameter of the DCI content information in the second part of the information, and perform convolutional decoding for specific DCI content information in the second part of the information according to the related parameter.

The indication information includes part or all combinations of DCI type information, bandwidth information, and information about the number of transmission antenna ports, and the related parameter includes a DCI content length.

De-interleaving is performed for the PDCCH information, to obtain the first part of the information obtained after user feature information is added to the first part of the information and encoding and rate matching are performed for the first part of the information.

The first part of the information is obtained according to results generated from performing de-rate matching, verifying the user feature information, and performing decoding for the first part of the information.

When the first part of the information further includes aggregation level AL information and/or PDCCH location information, the obtaining unit obtains the first part of the information according to the results generated from performing de-rate matching, verifying the user feature information, and performing decoding for the first part of the information and the aggregation level AL information and/or PDCCH location information.

In the embodiment of the present invention, the apparatus may be a user terminal, or an intermediate relay (Relay) node apparatus.

In the embodiment of the present invention, by sending the PDCCH information including the indication information, the receiving end is enabled to obtain the first part of the information, obtain the related parameters of the DCI content information in the second part of the information according to the indication information in the first part of the information, and perform, according to the related parameters, convolutional decoding for specific DCI content information that confirms to the related parameters and is in the second part of the information, without the need of performing convolutional decoding for all DCI content information, to reduce the number of times of convolutional decoding, thereby reducing the amount of computation and improving the process efficiency.

Embodiment 11

Referring to FIG. 11, an embodiment of the present invention provides a system 111 for downlink channel communication, which includes:

a sending node 1111, configured to send physical downlink control channel PDCCH information, where original information of the PDCCH information includes first part of the information and second part of the information; the second part of the information includes downlink control information DCI content information, and the first part of the information includes indication information for indicating a related parameter of the DCI content information in the second part of the information; and a receiving node 1112, configured to obtain the first part of the information after receiving the PDCCH information, obtain the related parameter of the DCI content information in the second part of the information according to the indication information in the first part of the information, and perform convolutional decoding for specific DCI content information in the second part of the information according to the related parameter.

The indication information includes DCI type information, bandwidth information, or information about the number of transmission antenna ports, and the related parameter includes a DCI content length.

When the sending node sends the PDCCH information, the sending node performs encoding for the first part of the information, adds user feature information to the first part of the information, performs rate matching for the first part of the information, interleaves the first part of the information with the second part of the information processed, and maps the information to the PDCCH information for being sent.

The receiving, by the receiving node, the first part of the information includes: de-interleaving the received PDCCH information, and obtaining the first part of the information obtained after user feature information is added, encoding and rate matching are performed for the first part of the information; and obtaining the first part of the information according to results generated from verifying the user feature information and performing decoding for the first part of the information.

In the embodiment of the present invention, by sending the PDCCH information including the indication information, the receiving end is enabled to obtain the first part of the information, obtain the related parameters of the DCI content information in the second part of the information according to the indication information in the first part of the information, and perform, according to the related parameters, convolutional decoding for specific DCI content information that confirms to the related parameters and is in the second part of the information, without the need of performing convolutional decoding for all DCI content information, to reduce the number of times of convolutional decoding, thereby reducing the amount of computation and improving the process efficiency.

Those of ordinary skill in the art should understand that all or a part of the flow of the method according to the embodiments of the present invention may be implemented by a computer program instructing relevant hardware. The program may be stored in a computer readable storage medium. When the program runs, the processes of the methods according to the embodiments of the present invention are performed. The storage medium may be a magnetic disk, an optical disk, a Read-Only Memory (Read-Only Memory, ROM), or a Random Access Memory (Random Access Memory, RAM).

The objectives, technical solutions, and beneficial effects of the present invention have been described in further detail through the foregoing preferred embodiments. It should be understood that the above description is merely specific embodiments of the present invention, but not intended to limit the present invention. Any modification, equivalent replacement, or improvement made without departing from the idea and principle of the present invention should fall within the protection scope of the present invention.

What is claimed is:

1. A method for downlink channel transmission, comprising:
   receiving physical downlink control channel PDCCH information, wherein
      information of the PDCCH information comprises first part of the information and second part of the information,
      the second part of the information comprises downlink control information (DCI) content information, and
      the first part of the information is indication information for indicating a related parameter of the DCI content information in the second part of the information;
   obtaining the first part of the information, and before obtaining, from the first part of information, the related parameter of the DCI content information in the second part of the information, verifying only whether the first part of the information is correct,
      if the first part of the information is correct according to the verifying, obtaining, from the first part of information, the related parameter of the DCI content information in the second part of the information according to the indication information in the first part of the information and performing convolutional decoding for the DCI content information in the second part of the information according to the obtained related parameter,
      if the first part of the information is not correct according to the verifying, not performing convolutional decoding for the DCI content information in the second part of the information.

2. The method for downlink channel transmission according to claim 1, wherein:
   the indication information indicating the related parameter in the first part of the information is part or any combination of DCI type information, bandwidth information, or information about number of transmission antenna ports,
   the indication information indicative of a length of the DCI content information.

3. The method for downlink channel transmission according to claim 1, wherein the obtaining the first part of the information comprises:
   performing de-interleaving the PDCCH information, and obtaining the first part of the information, where the user feature information was added to the first part of the information and encoding and rate matching were performed for the first part of the information; and
   obtaining the first part of the information according to results, wherein the results are generated from performing de-rate matching for the first part of the information, verifying the user feature information, and performing decoding for the first part of the information.

4. An apparatus for downlink channel transmission, comprising:
   a receiving unit, configured to receive physical downlink control channel PDCCH information, wherein information of the PDCCH information comprises first part of the information and second part of the information,
      the second part of the information comprises downlink control information (DCI) content information, and
      the first part of the information is indication information for indicating a related parameter of the DCI content information in the second part of the information;
   an obtaining unit, configured to obtain the first part of the information; and
   a processing unit, configured to before obtaining, from the first part of information, the related parameter of the DCI content information in the second part of the information, verify only whether the first part of the information is correct,
      if the first part of the information is correct, obtain, from the first part of information, the related parameter of the DCI content information in the second part of the information according to the indication information in the first part of the information and perform convolutional decoding for the DCI content information in the second part of the information according to the obtained related parameter,
      if the first part of the information is not correct, not performing convolutional decoding for the DCI content information in the second part of the information.

5. The apparatus for downlink channel transmission according to claim 4, wherein:
   the indication information indicating the related parameter in the first part of the information is part or any combination of DCI type information, bandwidth information, or information about number of transmission antenna ports,
   the indication information indicative of a length of the DCI content information.

6. The apparatus for downlink channel transmission according to claim 5, wherein the obtaining, by the obtaining unit, the first part of the information comprises:
   performing de-interleaving for the PDCCH information, and obtaining the first part of the information, where the user feature information was added and encoding and rate matching were performed for the first part of the information; and
   obtaining the first part of the information according to results, wherein the results are generated from performing de-rate matching for the first part of the information, verifying the user feature information, and performing decoding for the first part of the information.

7. The apparatus for downlink channel transmission according to claim 6, wherein:

when the first part of the information further comprises aggregation level AL information and/or PDCCH location information, the obtaining unit obtains the first part of the information according to: the results generated from performing the de-rate matching for the first part of the information, verifying the user feature information, and performing the decoding for the first part of the information and the aggregation level AL information and/or PDCCH location information.

8. A system for downlink channel communication, comprising:
 a sending node, configured to send physical downlink control channel PDCCH information, wherein information of the PDCCH information comprises first part of the information and second part of the information,
  the second part of the information comprises downlink control information (DCI) content information, and
  the first part of the information is indication information for indicating a related parameter of the DCI content information in the second part of the information; and
 a receiving node, configured to receive the PDCCH information and obtain the first part of the information, and before obtaining, from the first part of information, the related parameter of the DCI content information in the second part of the information, verify only whether the first part of the information is correct,
  if the first part of the information is correct, obtain, from the first part of information, the related parameter of the DCI content information in the second part of the information according to the indication information in the first part of the information and perform convolutional decoding for the DCI content information in the second part of the information according to the obtained related parameter,
  if the first part of the information is not correct, perform no convolutional decoding for the DCI content information in the second part of the information.

9. The system for downlink channel communication according to claim 8, wherein:
 the indication information indicating the related parameter in the first part of the information is part or any combination of DCI type information, bandwidth information, or information about number of transmission antenna ports,
 the indication information indicative of length of the DCI content information.

10. The system for downlink channel communication according to claim 8, wherein:
 when the sending node is configured to send the PDCCH information, the sending node is configured to perform encoding for the first part of the information, add user feature information to the first part of the information and perform rate matching for the first part of the information, interleave the first part of the information and the second part of the information, and map the first part of the information to the PDCCH information for being sent;
 when the receiving node is configured to obtain the first part of the information, the receiving node is configured to perform de-interleaving the PDCCH information received, and obtain the first part of the information, where the user feature information was added to the first part of the information and the encoding and rate matching were performed for the first part of the information; and obtain the first part of the information according to results, wherein the results are generated from verifying the user feature information and performing decoding for the first part of the information.

\* \* \* \* \*